(12) United States Patent
Cui et al.

(10) Patent No.: US 8,531,917 B2
(45) Date of Patent: Sep. 10, 2013

(54) DIRECTION OF ARRIVAL ESTIMATION APPARATUS AND METHOD THEREOF

(75) Inventors: Weiwei Cui, Yongin-si (KR); Ki Wan Eom, Suwon-si (KR); Hyung-Joon Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 12/760,360

(22) Filed: Apr. 14, 2010

(65) Prior Publication Data

US 2010/0315292 A1 Dec. 16, 2010

(30) Foreign Application Priority Data

Jun. 12, 2009 (KR) .................. 10-2009-0052563

(51) Int. Cl.
*G01S 3/802* (2006.01)
(52) U.S. Cl.
USPC ............................ 367/124; 367/125; 367/127
(58) Field of Classification Search
USPC ......................................... 367/124, 125, 127
See application file for complete search history.

(56) References Cited

U.S. PATENT DOCUMENTS

| 5,444,451 | A | * | 8/1995 | Johnson et al. | 342/453 |
| 6,008,759 | A | | 12/1999 | Tangemann et al. | |
| 8,022,874 | B2 | * | 9/2011 | Frieaizen | 342/445 |
| 2009/0128397 | A1 | | 5/2009 | Owens | |

FOREIGN PATENT DOCUMENTS

| JP | 2001-305202 A | 10/2001 |
| KR | 10-2007-0077228 A | 7/2007 |

OTHER PUBLICATIONS

R. Schmidt, "Multiple Emitter Location and Signal Parameter Estimation," *IEEE Transactions on Antennas and Propagation*, vol. AP-34, No. 3, Mar. 1986, pp. 276-280.

M. Zoltowski et al., "Real-Time Frequency and 2-D Angle Estimation with Sub-Nyquist Spatio-Temporal Sampling," *IEEE Transactions on Signal Processing*, vol. 42, No. 10, Oct. 1994, pp. 2781-2794.

Y. Yang et al., "DOA Estimation for Coherent Sources in Beamspace Using Spatial Smoothing," *Proceedings of the 2003 Joint Conference of The Fourth International Conference on Information, Communications & Signal Processing and Fourth Pacific-Rim Conference on Multimedia*, ICICS-PCM 2003, Singapore, Dec. 15-18, 2003, pp. 1028-1032.

N. Ma et al., "DOA Estimation for Broadband Chirp Signals," *Proceedings of the 2004 IEEE International Conference on Acoustics, Speech and Signal Processing*, ICASSP 2004, Montreal, May 17-21, 2004, vol. 2, pp. II-261-II-264.

(Continued)

*Primary Examiner* — Cassie Galt
(74) *Attorney, Agent, or Firm* — NSIP Law

(57) ABSTRACT

An apparatus for estimating a Direction of Arrival (DOA) of a wideband includes a first signal receiving unit and a second signal receiving unit to receive a wideband signal while satisfying $d \leq Mc/2f_s$, wherein 'd' denotes a distance the first signal receiving unit and the second signal receiving unit are spaced apart from each other, 'c' denotes the speed of sound, 'M' denotes a number of wideband frequencies being a number of fast Fourier transformation (FFT) points of a wideband signal, and '$f_s$' denotes a sampling frequency, and a DOA calculating unit to calculate a DOA ($\theta$) using a normalized frequency ($\tilde{f}$) which is obtained by performing an FFT on the respective wideband signals transmitted from the first signal receiving unit and the second signal receiving unit, and using the distance d.

8 Claims, 4 Drawing Sheets

(56) References Cited

OTHER PUBLICATIONS

M. Togami et al., "Stepwise Phase Difference Restoration Method for Sound Source Localization Using Multiple Microphone Pairs," *Proceedings of the 2007 IEEE International Conference on Acoustics, Speech and Signal Processing*, ICASSP 2007, Honolulu, Apr. 15-20, 2007, vol. 1, pp. I-117-I-120.

W. Zhong et al., "Wideband angle of arrival estimation of chirp signals using virtual Wignerville distribution," *Journal of Systems Engineering and Electronics*, vol. 18, No. 2, 2007, pp. 243-248.

G. Li et al, "An Efficient Implementation of a Robust Phase-Unwrapping Algorithm," *IEEE Signal Processing Letters*, vol. 14, No. 6, Jun. 2007, pp. 393-396.

A. Lin et al., "Doppler and Direction-of-Arrival (DDOA) Radar for Multiple-Mover Sensing," *IEEE Transactions on Aerospace and Electronic Systems*, vol. 43, No. 4, Oct. 2007, pp. 1496-1509.

W. Cui et al., "DOA Estimation for Wideband Signal: Multiple Frequency Bins Versus Multiple Sensors," Proceedings of the 7th Annual IEEE Consumer Communications and Networking Conference, CCNC 2010, Jan. 9-12, 2010, Las Vegas, pp. 1-5.

\* cited by examiner (a) d = 0.5m (b) d = 2m

DIRECTION OF ARRIVAL ESTIMATION APPARATUS AND METHOD THEREOF

CROSS-REFERENCE TO RELATED APPLICATIONS

This application claims the benefit under 35 U.S.C. §119(a) of Korean Patent Application No. 10-2009-0052563 filed on Jun. 12, 2009, in the Korean Intellectual Property Office, the entire disclosure of which is incorporated herein by reference for all purposes.

BACKGROUND

1. Field

The following description relates to an apparatus and method of estimating a Direction of Arrival (DOA) receiving a wideband signal, and more particularly, to an apparatus and method of estimating a DOA of the wideband signal using a fast Fourier transform (FFT).

2. Description of Related Art

In recent years, business meeting-related electronic devices and small sized-home electronic devices such as entertainment devices or video games have been gaining popularity. Accordingly, in order to automatically track an active speaker in video conference or an object, a Direction of Arrival (DOA) estimation technique is combined in a Human Computer Interface (HCI), and thereby the HCI is more user-friendly and practical. Accordingly, the DOA estimation has been extensively studied in radar, sensor networks, and speech communication systems.

A widely used DOA estimation method may be a multiple signal classification (MUSIC) method, which performs narrow band signal DOA detection. In order to obtain a DOA of a wideband signal, a method to correct and improve a MUSIC technique originally used in the narrowband signal is needed, and a method in which the DOA and a source direction of the object are obtained by decomposing the wideband signal into multiple frequency bins, and then applying the narrowband algorithm may be used.

In a DOA estimation using a sensor array, in response to an inter-sensor spacing being significantly increased, a source not existing practically may appear to exist, and this is referred to as a spatial aliasing. Accordingly, to avoid the spatial aliasing, the maximal inter-sensor spacing should be less than a half-wavelength of a received signal. However, the DOA may not be accurately estimated with respect to a signal received from a long distance when the inter-sensor spacing is relatively reduced, and thus a large number of sensors may be used as an alternative solution.

Accordingly, a DOA resolution may be proportional to a maximal length of an aperture of the sensor array. Thus, where the above two described conditions are applied in the MUSIC, a greater number of sensors may be required. Since most studies related with the DOA of the wideband signal are based on a high resolution method such as a conventional MUSIC, a number of sensors may be increased, and a computation may become more complex.

SUMMARY

In one general aspect, an apparatus for estimating a Direction of Arrival (DOA) includes a first signal receiving unit and a second signal receiving unit to receive a wideband signal while satisfying an equation $d \leq Mc/2f_s$, wherein 'd' denotes a distance the first signal receiving unit and the second signal receiving unit are spaced apart from each other, 'c' denotes the speed of sound, 'M' denotes a number of wideband frequencies being a number of fast Fourier transformation (FFT) points of a wideband signal, and '$f_s$' denotes a sampling frequency, and a DOA calculating unit to calculate a DOA ($\theta$) using a normalized frequency ($\bar{f}$) which is obtained by performing an FFT on the respective wideband signals transmitted from the first signal receiving unit and the second signal receiving unit, and using the distance 'd'.

The first receiving unit and the second receiving unit may be spaced apart from each other by the distance 'd' satisfying the following equation:

$$\frac{Mc}{f_s d} \bar{f} \Big|_{\bar{f}=0.5} \approx 1.$$

The DOA ($\theta$) may be calculated using the normalized frequency ($\bar{f}$) and the distance d based on the following equation:

$$\theta = \cos^{-1}\left(\frac{Mc}{f_s d} \bar{f}\right),$$

where ($\bar{f}$) may be calculated by performing an M-point FFT based on the following equation:

$$\bar{f} = \frac{1}{M} \operatorname*{argmax}_{m} \{FFT[P_m(m = 1, 2, \ldots, M)]\},$$

where '$P_m$' denotes a cross power spectral density (CPSD), and may be calculated based on the following equation:

$$P_m = X_{1,m} X_{0,m}^* = M^2 e^{-j2\pi m \frac{f_s}{M}(\tau_1 - \tau_0)},$$

where $X_{0,m}$ denotes a first signal which is received by the first signal receiving unit, $X_{1,m}$ denotes a second signal which is received by the second signal receiving unit, $\tau_1$ denotes a time delay of the second signal, $\tau_0$ is zero, and the first signal and the second signal satisfy the following equation performing an N-point FFT:

$$X_i(k) = \sum_{n=0}^{N-1} \sum_{m=1}^{M} e^{-j2\pi m f_0 \tau_i} e^{j2\pi m f_0 nT_s} e^{-j\frac{2\pi}{N}kn}$$

$$= \sum_{m=1}^{M} e^{-j2\pi m f_0 \tau_i} \sum_{n=0}^{N-1} e^{-j\frac{2\pi}{N}n(k-mf_0 NT_s)},$$

where $f_0 = f_s/M$, $mf_0$ denotes an m-th harmonic component, and $N=M$.

In another general aspect, a method of estimating a Direction of Arrival (DOA) includes installing a first receiving unit and a second receiving unit to satisfy an equation $d \leq Mc/2f_s$ where 'c' denotes the speed of sound, 'M' denotes a number of wideband frequencies being a number of FFT points of a wideband signal, and '$f_s$' denotes a sampling frequency, and to be spaced apart from each other by a distance 'd' approaching a maximum value, obtaining a normalized frequency ($\bar{f}$) by performing an FFT on wideband signals received in the first signal receiving unit and the second signal receiving unit, and calculating a DOA of the wideband signal using the normalized frequency ($\bar{f}$) and the distance d.

The first receiving unit and the second receiving unit may be spaced apart from each other by the distance d satisfying the following equation:

$$\frac{Mc}{f_s d}\bar{f}\bigg|_{\bar{f}=0.5} \approx 1.$$

The obtaining of the normalized frequency ($\bar{f}$) may include performing an N-point FFT satisfying the following equation with respect to the respective wideband signals received in the first signal receiving unit and the second signal receiving unit:

$$X_i(k) = \sum_{n=0}^{N-1}\sum_{m=1}^{M} e^{-j2\pi mf_0\tau_i} e^{j2\pi mf_0 nT_s} e^{-j\frac{2\pi}{N}kn}$$
$$= \sum_{m=1}^{M} e^{-j2\pi mf_0\tau_i} \sum_{n=0}^{N-1} e^{-j\frac{2\pi}{N}n(k-mf_0 NT_s)},$$

where $f_0=f_s/M$, $mf_0$ denotes an m-th harmonic component, and N=M, obtaining a CPSD ($P_m$) of a first signal ($X_{0,m}$) and a second signal ($X_{1,m}$) received in the first signal receiving unit and the second signal receiving unit based on the following equation:

$$P_m = X_{1,m}X_{0,m}^* = M^2 e^{-j2\pi m\frac{f_s}{M}(\tau_1-\tau_0)},$$

where $\tau_0$ is zero, and $\tau_1$ denotes a time delay of the second signal, and obtaining the normalized based frequency ($\bar{f}$) by performing an M-point FFT based on the following equation:

$$\bar{f} = \frac{1}{M}\underset{m}{\mathrm{argmax}}\{FFT[P_m(m = 1, 2, \ldots, M)]\}.$$

The calculating of the DOA may include obtaining the DOA based on the following equation:

$$\theta = \cos^{-1}\left(\frac{Mc}{f_s d}\bar{f}\right).$$

In another general aspect, a computer-readable storage medium stores a program for estimating a Direction of Arrival (DOA), including instructions to cause a computer to control a first receiving unit and a second receiving unit to receive wideband signals, the first receiving unit and the second receiving unit being installed to satisfy an equation d≦Mc/2$f_s$, where 'c' denotes the speed of sound, 'M' denotes a number of wideband frequencies being a number of FFT points of a wideband signal, and '$f_s$' denotes a sampling frequency, and to be spaced apart from each other by a distance 'd' approaching a maximum value, obtain a normalized frequency ($\bar{f}$) by performing an FFT on the wideband signals received in the first signal receiving unit and the second signal receiving unit, and calculate a DOA of the wideband signals using the normalized frequency ($\bar{f}$) and the distance d.

Other features and aspects will be apparent from the following detailed description, the drawings, and the claims.

Figure 1:
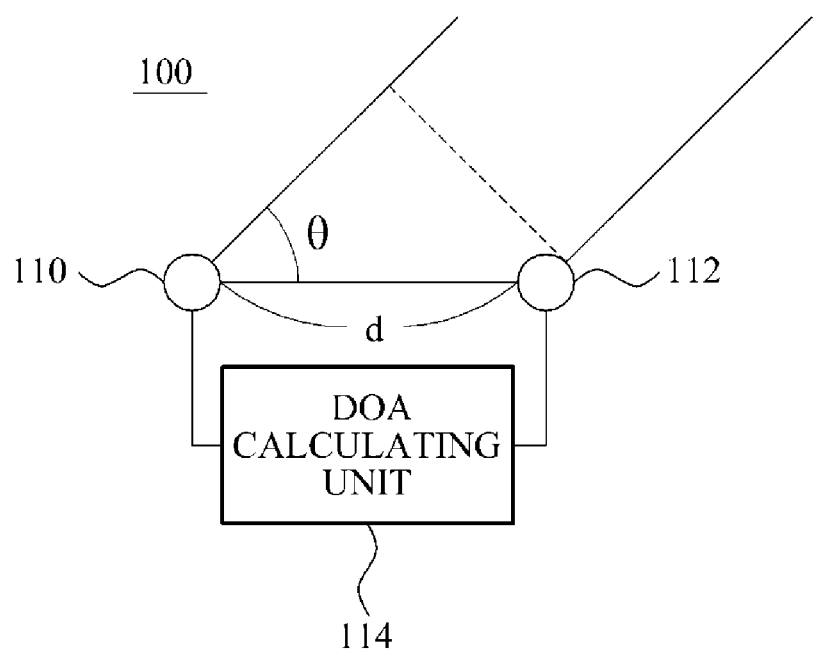
FIG. 1 is a schematic diagram illustrating an example of an apparatus of estimating a Direction of Arrival (DOA).

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, description of well-known functions and constructions may be omitted for increased clarity and conciseness.

FIG. 1 illustrates an example of an apparatus 100 which estimates a Direction of Arrival (DOA).

The apparatus 100 includes a first signal receiving unit 110, a second signal receiving unit 112, and a DOA calculating unit 114. The first and second signal receiving units 110 and 112, respectively, may include a sensor to receive a wideband signal transmitted from an external object. The first and second signal receiving units 110 and 112 may be spaced apart from each other by a distance set to estimate the DOA (θ).

The wideband signal may be received through the first and second signal receiving units 110 and 112, respectively, and may be transmitted, as an electronic signal, to the DOA calculating unit 114 in order to estimate the DOA (θ).

A signal radiowave model of the apparatus 100 may be derived from FIG. 1. Accordingly, the signal may be from a direction of the DOA (θ), and two sensors, that is, the first and second signal receiving units 110 and 112, respectively, may be spaced apart from each other by a distance (d). An incoming wave of a signal scattered off a target may arrive at the two adjacent sensors with a path length difference of Δd, such that Δ denotes a difference and Δd is represented by a following Equation 1.

$$\Delta d = d\cos\theta \qquad \text{[Equation 1]}$$

A phase difference Δψ of two signals may be expressed with respect to Δd, as illustrated in a following Equation 2.

$$\Delta\psi = \frac{2\pi}{\lambda}\Delta d \qquad \text{[Equation 2]}$$

In the above Equation 2, λ denotes a signal wavelength. From Equations 1 and 2, the DOA (θ) may be obtained by a following Equation 3.

$$\theta = \cos^{-1}\left(\frac{\Delta\psi}{2\pi d/\lambda}\right) \qquad \text{[Equation 3]}$$

A problem may arise concerning an array based on DOA estimation. More specifically, there may be a spatial ambiguity between the first and second signal receiving units 110 and 112. That is, just as aliasing occurs in an analog to digital (AD) converter when the sampling rate does not satisfy the Nyquist law (i.e., Nyquist law states that a sound must be sampled at least twice its highest analog frequency in order to extract all of the information from the bandwidth and accurately represent the original acoustic frequency), the spatially separated sensors (i.e., the first and second signal receiving units 110 and 112) sample received signals in space. Accordingly, aliasing may occur where an inter-sensor spacing is too large. To avoid spatial aliasing, a maximal phase difference between two signals at the first signal receiving unit 110 and the second signal receiving unit 112 may be required to be within $[-\pi, \pi]$, as demonstrated by a following Equation 4.

$$|\Delta\psi_{max}| = \frac{2\pi d|\cos\theta|}{\lambda_{min}} \leq \pi \qquad \text{[Equation 4]}$$

An anti-aliasing condition may be expressed as the following Equation 5.

$$d \leq \frac{\lambda_{min}}{2} = \frac{c}{2f_{max}} \qquad \text{[Equation 5]}$$

In the above Equation 5, 'c' denotes the speed of sound, and $f_{max}$ denotes a maximal frequency. Where d is designed according to $f_{max}$, low frequency components may not achieve a good resolution to perform the DOA estimation. In order to make full use of all frequency bins of a target signal, a DOA estimation method using the wideband information according to example embodiments may be suggested. According to an example embodiment, the distance (d) between the first signal receiving unit 110 and the second signal receiving unit 112 may be determined by a frequency resolution rather than half of the minimal wavelength.

As stated above, the first signal receiving unit 110 and the second signal receiving unit 112 may also be known as the two sensors, as illustrated in FIG. 1. By adopting a two-step fast Fourier Transformation (FFT) with respect to a plurality of signal receiving units (a first step corresponding to following Equations 6 through 10 and a second step corresponding to following Equations 11 through 19), an equation of a received signal at an i-th signal receiving unit may be obtained, and a DOA calculating process operated by the DOA calculating unit 114 and a distance condition of the first and second signal receiving units 110 and 112, respectively, may be calculated based on the obtained equation.

The received signal at the i-th sensor may be expressed as the following Equation 6.

$$x_i(t) = s(t-\tau_i); \ i=0,1 \qquad \text{[Equation 6]}$$

In the above Equation 6, $\tau_i$ denotes a time delay introduced by a signal propagation of the signal. Where a bandwidth of the signal is limited with a unit amplitude, Equation 7 below may be used with respect to each sensor.

$$x_i(t) = \sum_{m=1}^{M} e^{j2\pi m f_0(t-\tau_i)} \qquad \text{[Equation 7]}$$

In the above Equation 7, $mf_0$ denotes an m-th harmonic component. Where it is assumed that a signal is sampled at a period of $T_s$, Equation 8 below may be satisfied.

$$x_i(nT_s) = \sum_{m=1}^{M} e^{-j2\pi m f_0 \tau_i} e^{j2\pi m f_0 nT_s}; \ i = 0, 1 \qquad \text{[Equation 8]}$$

Since the highest frequency of $x_i(t)$ is $f_{max}=Mf_0$, a Nyquist sampling frequency ($f_s$) corresponding to a sideband signal is represented by a following Equation 9.

$$f_s = \frac{1}{T_s} = Mf_0 \qquad \text{[Equation 9]}$$

Where calculating an N-point FFT of $x_i(nT_s)$, Equation 10 below with respect to the first step of the FFT may be obtained.

$$X_i(k) = \sum_{n=0}^{N-1} \sum_{m=1}^{M} e^{-j2\pi m f_0 \tau_i} e^{j2\pi m f_0 nT_s} e^{-j\frac{2\pi}{N}kn} \qquad \text{[Equation 10]}$$

$$= \sum_{m=1}^{M} e^{-j2\pi m f_0 \tau_i} \sum_{n=0}^{N-1} e^{-j\frac{2\pi}{N}n(k-mf_0 NT_s)}$$

In the above Equation 10, k=1, 2, . . . , N, and m=1, 2, M. From Equation 10, the following Equation 11 is derived.

$$\sum_{n=0}^{N-1} e^{-j\frac{2\pi}{N}n(k-mf_0 NT_s)} = \begin{cases} N & k = mf_0 NT_s \\ 0 & \text{others} \end{cases} \qquad \text{[Equation 11]}$$

In order to distinguish each frequency bin involved in the whole band of $x_i(nT_s)$, the lowest and the highest frequency in a signal $x_i(nT_s)$ are represented by one of the elements in a sequence $X_i(k)$, i.e., a following Inequality 1.

$$\begin{cases} f_0 NT_s \geq 1 \\ Mf_0 NT_s \leq N \end{cases} \qquad \text{[Inequality 1]}$$

From Inequality 1, a following Inequality 2 may be obtained.

$$N \geq Mf_0 NT_s \geq M \qquad \text{[Inequality 2]}$$

Where an FFT-point N is fixed, the highest frequency bin of a source signal may be attained at M=N, therefore Equation 12 below may be obtained.

$$f_0 NT_s = 1 \Leftrightarrow f_0 = \frac{1}{NT_s} = \frac{f_s}{M} \qquad \text{[Equation 12]}$$

When substituting Equation 12 into Equation 10, as well as considering Equation 11, Equation 13 below may be obtained, which is represented as follows.

$$X_i(k) = M \sum_{m=1}^{M} e^{-j2\pi m \frac{f_s}{M} \tau_i} \delta(k-m) \quad \text{[Equation 13]}$$

Where $\delta(n)$ is the Kronecker delta function, and it is defined as $$\delta[n] = \begin{cases} 1, & n=0 \\ 0, & n \neq 0. \end{cases}$$

Suppose an m-th harmonic coefficient at the i-th sensor is represented as a following Equation 14.

$$X_{i,m} = M e^{-j2\pi m \frac{f_s}{M} \tau_i}; \; i = 0, 1 \quad \text{[Equation 14]}$$
$$m = 1, 2, \ldots, M$$

A cross-power spectral density (CPSD) between signals received by two sensors, that is, two signal receiving units, is defined within a following Equation 15.

$$P_m = X_{1,m} X_{0,m}^* = M^2 e^{-j2\pi m \frac{f_s}{M}(\tau_1 - \tau_0)} \quad \text{[Equation 15]}$$

In the above Equation 15, $\bar{f}$ denotes a normalized frequency. It is assumed that the first signal receiving unit 110 is a reference channel ($\tau_0 = 0$). Based on the schematic illustrated in FIG. 1, Equation 16 below may be obtained, which is represented as follows.

$$\bar{f} = \frac{f_s}{M} \tau_1 = \frac{f_s d \cos\theta}{Mc} \quad \text{[Equation 16]}$$

Equation 16 demonstrates that $\bar{f}$ may be estimated via the M-point FFT. According to the estimated $\bar{f}$, the DOA ($\theta$) may be computed as a following Equation 17.

$$\theta = \cos^{-1}\left(\frac{Mc}{f_s d} \bar{f}\right) \quad \text{[Equation 17]}$$

Taking the spatial sampling theorem into account, the inter-sensor spacing, that is, a distance (d) between the first and second signal receiving units 110 and 112, respectively, should satisfy a following Inequality 3 below with respect to an equivalent frequency.

$$d \leq \frac{Mc}{2f_s} = M \frac{c}{2f_{max}} \quad \text{[Inequality 3]}$$

Compared with the distance (d) of Equation 5, the distance (d) between the first and second signal receiving units 110 and 112, respectively, of the apparatus of FIG. 1 may be expanded by M times. That is, since the inter-sensor spacing (d) is not restricted by a half-wavelength of a signal and is expanded by M times, that is, a multiple of a number of FFT points, the computation may be simplified to improve an estimation quality of the DOA.

A final distance (d) between the signal receiving units may be obtained by a following Equation 18.

$$\cos\theta = \frac{Mc}{f_s d} \bar{f} \quad \text{[Equation 18]}$$

As described above, the normalized frequency $\bar{f}$ may be derived by the M-point FFT in a following Equation 19, which is represented as follows.

$$\bar{f} = \frac{1}{M} \operatorname*{argmax}_{m} \{FFT[P_m(m=1,2,\ldots,M)]\} \quad \text{[Equation 19]}$$

A procedure of obtaining $\bar{f}$ is to find m which corresponds to a peak value of $FFT(P_m)$. Since a range of $\cos(\theta)$ may be $[-1, 1]$, m may be picked from a following Set 1, which is represented as follows.

$$Z = \left\{ m \;\Big|\; \left\|\frac{Mc}{f_s d} \frac{m}{M}\right\| \leq 1, m=1,\ldots,M \right\} \quad \text{[Set 1]}$$

Suppose $m=1, \ldots, M_0$ belongs to Z, then the area $[-1, 1]$ may be divided into $M_0$ subintervals. The inter-sensor spacing (d) may adjust an upper limit which $M_0$ may approach. The inter-sensor spacing (d) may be determined as a value satisfying Equation 20, which is represented as follows.

$$\left.\frac{Mc}{f_s d} \bar{f}\right|_{\bar{f}=0.5} \approx 1 \quad \text{[Equation 20]}$$

Noise influence on the DOA computed using the apparatus and method of estimating the DOA may be reduced with an increase in a number of points of the FFT, that is, an increase in M through a computation process using the FFT. With respect to a signal corrupted by a noise, acquisition of the DOA and the noise influence will be herein further described.

For example, a corrupted signal $y_i(t)$ received by an i-th sensor may be represented as follows.

$$y_i(t) = x_i(t) + v_i(t) \quad \text{[Equation 21]}$$

In the above Equation 21, $v_i(t)$ denotes an additive noise of the i-th sensor. After considering the noise influence by noise interferences, a following Equation 22 may be derived from the above Equation 14, which is represented as follows.

$$Y_{i,m} = X_{i,m} + V_{i,m} = M e^{-j2\pi m \frac{f_s}{M}\tau_i} + V_{i,m} \quad \text{[Equation 22]}$$

A CPSD of an m-th frequency bin of two signals received in the i-th sensor and a j-th sensor may be computed as a following Equation 23.

$$P_m = Y_{i,m} Y_{j,m}^* \quad \text{[Equation 23]}$$
$$= M^2 e^{-j2\pi m \frac{f_s}{M}(\tau_i - \tau_j)} + M e^{-j2\pi m \frac{f_s}{M}\tau_i} V_{j,m}^* +$$

-continued $$Me^{j2\pi m \frac{f_s}{M}\tau_j}V_{i,m} + V_{i,m}V_{j,m}^*$$

$$= M^2 e^{-j2\pi m \frac{f_s}{M}(\tau_i-\tau_j)}\begin{bmatrix} 1 + \frac{1}{M}e^{-j2\pi m \frac{f_s}{M}\tau_j}V_{j,m}^* + \\ \frac{1}{M}e^{j2\pi m \frac{f_s}{M}\tau_i}V_{i,m} + \\ \frac{1}{M^2}e^{j2\pi m \frac{f_s}{M}(\tau_i-\tau_j)}V_{i,m}V_{j,m}^* \end{bmatrix}$$

A first term in Equation 23 may be expected for DOA estimation, while the noise related to remaining parts of the summation may degrade the estimation results. However, these noise corrupted terms may be inversely proportional to M or $M^2$, and thereby a larger M will help to decrease the impacts introduced by noise.

After obtaining a function of the CPSD, the DOA then may be detected from a phase part of $P_m$, i.e., a following Equation 24.

$$\arg(P_m) = \arg(Y_{i,m}Y_{j,m}^*) \quad [\text{Equation 24}]$$

$$= \arg\left(\frac{X_{i,m}+V_{i,m}}{X_{j,m}+V_{j,m}}\right)$$

$$= \arg\left(\frac{X_{i,m}}{X_{j,m}}\right) + \arg\left(1+\frac{V_{i,m}}{X_{i,m}}\right) + \arg\left(1+\frac{V_{j,m}}{X_{j,m}}\right)$$

In the above Equation 24, $\arg(1+V_{i,m}/X_{i,m})$ depends on a signal-to-noise ratio (SNR), but is uncorrelated with $\arg(1+V_{j,m}/X_{j,m})$ corresponding to an uncolored noise which is not a directional type of noise. Equation 24 indicates that a variance of a phase difference is a function with respect to SNR. Where substituting the above described conditions, a DOA of a target signal may be implicit in a following Equation 25, which is represented as follows.

$$\arg\left(\frac{X_{i,m}}{X_{j,m}}\right) = -2\pi m f_0 \frac{d\cos\theta}{c} \quad [\text{Equation 25}]$$

In the above Equation 25, an increase in the inter-sensor spacing d may cause an increase in the phase difference $\arg(X_{i,m}/X_{j,m})$, which increase the proportional of speech signal in equation (24), therefore the variance of the DOA estimate can be decreased to improve the DOA estimation performance.

Figure 2:
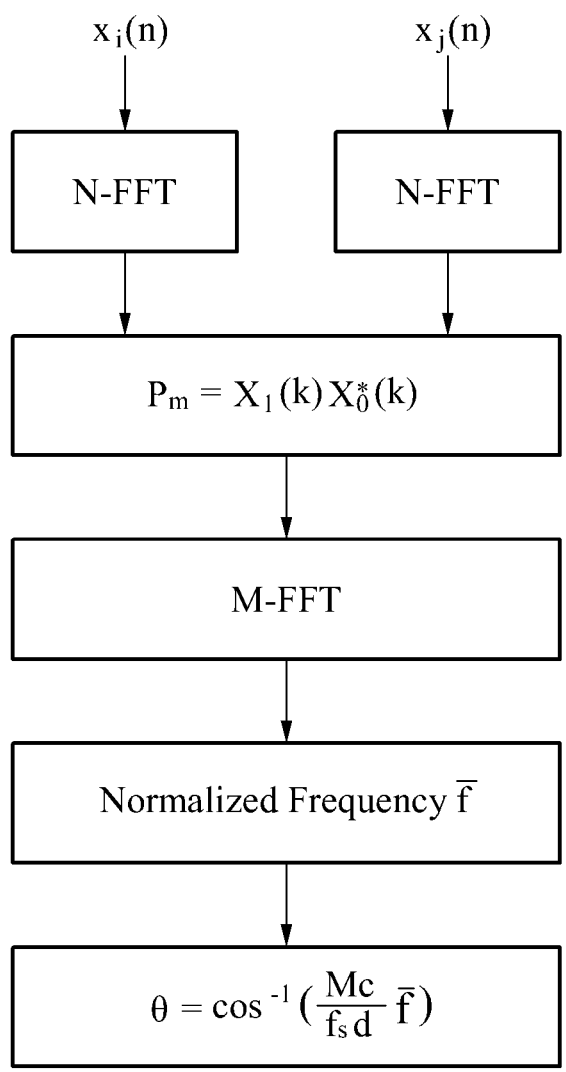
FIG. 2 is a flowchart illustrating an example of a method of estimating a DOA.

FIG. 2 illustrates an example of a method of estimating a DOA.

An N-point FFT may be performed with respect to each of signals ($x_i(n)$, $x_j(n)$) input in the two signal receiving units to obtain a CPSD. An M-point FFT may be performed with respect to the obtained CPSD.

By estimating a normalized frequency $\bar{f}$, a DOA may be finally obtained as the Equation 17 above.

How to improve a DOA resolution by the inter-sensor spacing d, that is, the distance between two signal receiving units, will be further described with reference to FIGS. 3 and 4.

Accordingly, a SNR may be assumed to be 5 dB. FIG. 3 illustrates an estimation result obtained by using an example of apparatus and method of estimating a DOA where a distance between two sensors is 0.5 m.

Figure 3:
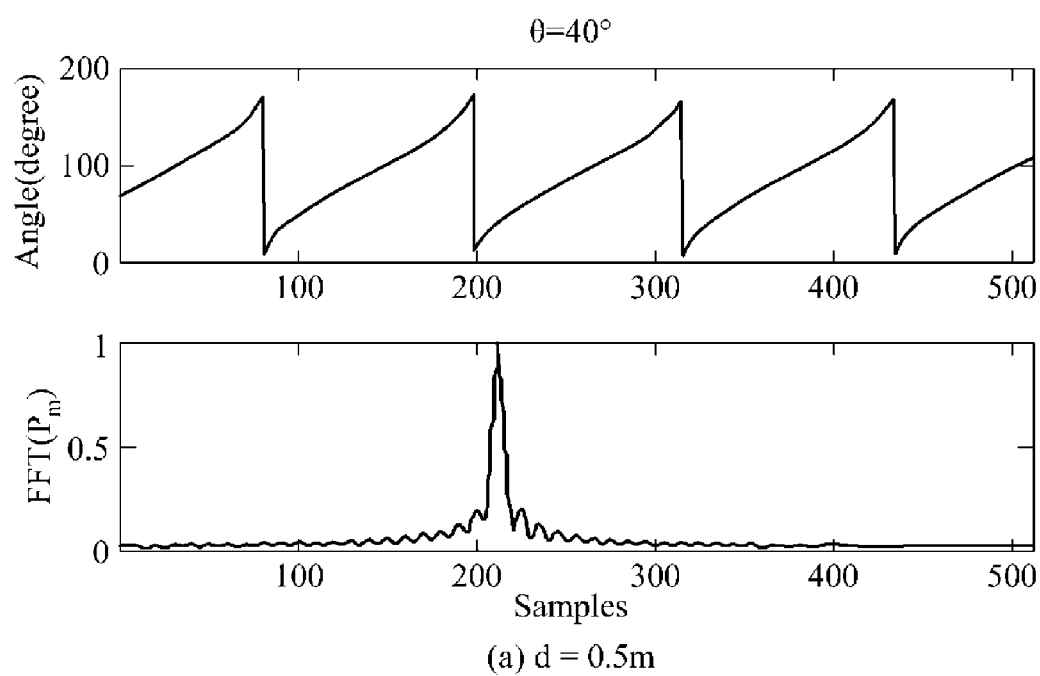
FIG. 3 is a graph illustrating an estimation result obtained by using an example of an apparatus and a method of estimating a DOA where a distance between two sensors is 0.5 meters (m).

In FIG. 3, a whole dataset is divided into four sections with repeated angle values. However, an actual source direction may only be determined within one of the four sections. With finite data samples, it is difficult to get a good resolution in DOA estimation.

Figure 4:
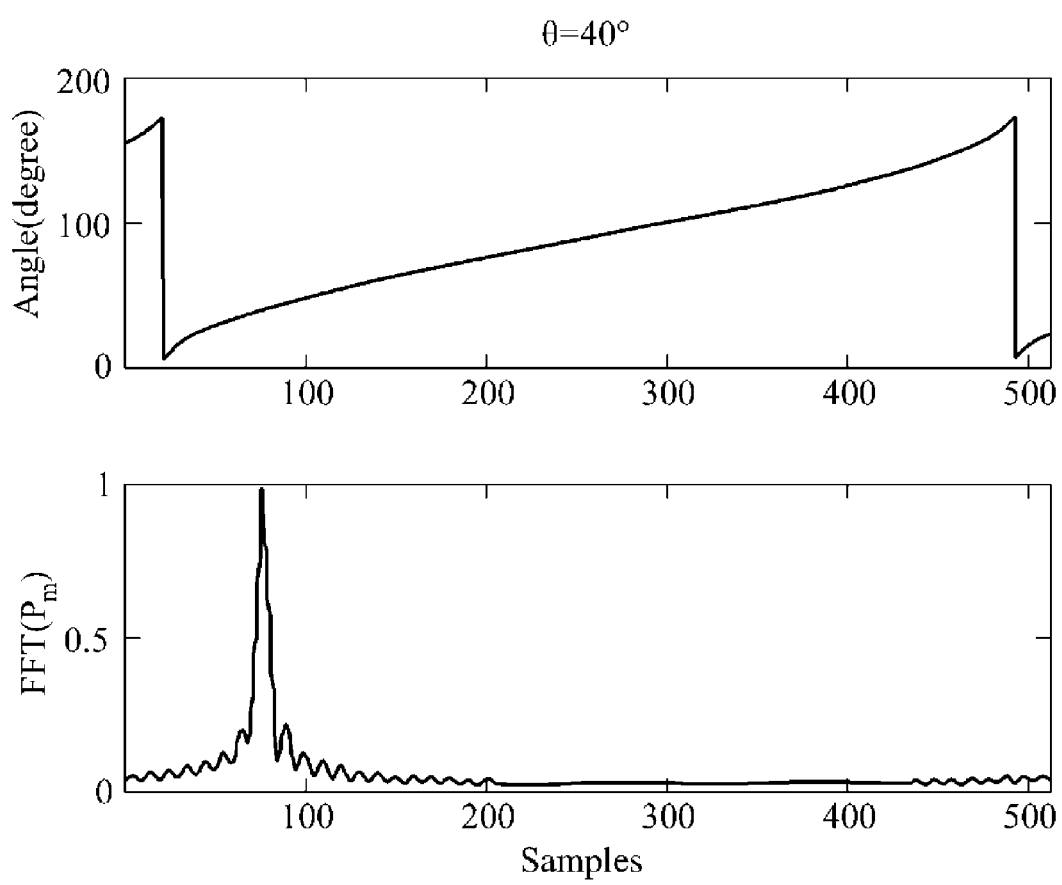
FIG. 4 is a graph illustrating an estimation result obtained by using an example of an apparatus and a method of estimating a DOA where a distance between two sensors is 2 m.

FIG. 4 illustrates an estimation result obtained by using an example of an apparatus and method of estimating a DOA where a distance between two sensors is 2 m.

In FIG. 4, since the inter-sensor spacing d is expanded to 2 m, and most of the data samples are involved in one period of an angle space, accuracy in DOA estimation may be greatly increased.

According to certain example(s) described above, a method and apparatus may be provided to estimate a DOA using a minimal number of sensors. For example, as described above, the apparatus and method of estimating the DOA may estimate a DOA using information about the wideband signal through only two sensors.

The apparatus and method of estimating the DOA may obtain the DOA using two-step FFT computations. Accordingly, computational complexity due to a plurality of sensors may be reduced.

Further, where the apparatus and method of estimating the DOA estimate the DOA using only two sensors, a half-wavelength in the inter-sensor spacing d, that is, a maximum value in the inter-sensor spacing d may be expanded to improve a DOA resolution of the DOA estimation.

The methods processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for estimating a Direction of Arrival (DOA) of wideband signals, the apparatus comprising:
   first and second signal receiving units, each configured to receive a wideband signal;

a DOA calculating unit configured to calculate a DOA ($\theta$) using a normalized frequency ($\bar{f}$), which is obtained by performing a fast Fourier transformation (FFT) on the respective wideband signals, and a distance between the first and second signal receiving units, wherein the distance satisfies an equation $d \leq (Mc)/(2f_s)$, where 'd' is the distance between the first and second signal receiving units, 'c' is the speed of sound in the environment of the first and second signal receiving units, '$f_s$' is a sampling frequency of the wideband signals, 'M' is a number of FFT points of the wideband signals and satisfies the equation $M = f_s/f_0$, and '$f_0$' is a fundamental frequency of the wideband signals, and the DOA calculating unit is configured to calculate the DOA ($\theta$) using the normalized frequency ($\bar{f}$), the distance 'd', and the number of FFT points of the wideband signals 'M', where ($\bar{f}$) is calculated by performing an M-point FFT based on a cross power spectral density (CPSD) '$P_m$'.

2. The apparatus of claim 1, wherein the first and second signal receiving units are spaced apart from each other by the distance 'd' substantially satisfying the following equation:

$$\left. \frac{Mc}{f_s d} \bar{f} \right|_{\bar{f}=0.5} \approx 1.$$

3. The apparatus of claim 1, wherein the DOA calculating unit is configured to calculate the DOA ($\theta$) using the normalized frequency ($\bar{f}$) and the distance 'd' based on the following equation:

$$\theta = \cos^{-1}\left(\frac{Mc}{f_s d} \bar{f}\right),$$

where ($\bar{f}$) is calculated by performing an M-point FFT based on the following equation:

$$\bar{f} = \frac{1}{M} \underset{m}{\mathrm{argmax}} \{FFT[P_m(m=1,2,\ldots,M)]\},$$

where '$P_M$' is calculated based on the following equation:

$$P_m = X_{1,m} X_{0,m}^* = M^2 e^{-j2\pi m \frac{f_s}{M}(\tau_1 - \tau_0)},$$

where $X_{0,m}$ denotes a first signal which is received by the first signal receiving unit, $X_{1,m}$ denotes a second signal which is received by the second signal receiving unit, $\tau_1$ denotes a time delay of the second signal, $\tau_0$ is zero, and the first signal and the second signal are calculated by performing an N-point FFT based on the following equation:

$$X_i(k) = \sum_{n=0}^{N-1} \sum_{m=1}^{M} e^{-j2\pi m f_0 \tau_i} e^{j2\pi m f_0 n T_s} e^{-j\frac{2\pi}{N} kn}$$

$$= \sum_{m=1}^{M} e^{-j2\pi m f_0 \tau_i} \sum_{n=0}^{N-1} e^{-j\frac{2\pi}{N} n(k - m f_0 N T_s)},$$

where $f_0 = f_s/M$, $mf_0$ denotes an m-th harmonic component, and $N=M$.

4. A method of estimating a Direction of Arrival (DOA) of wideband signals, the method comprising:

generating an equation that relates respective wideband signals received by first and second signal receiving units;

obtaining, with a processor, a normalized frequency ($\bar{f}$) by performing a fast Fourier transformation (FFT) on the equation, which equation is based on a cross power spectral density (CPSD) '$P_m$'; and calculating the DOA ($\theta$) of the wideband signals using the normalized frequency ($\bar{f}$), a distance between the first and second receiving units, and a number of FFT points of the wideband signals 'M', wherein the distance satisfies an equation $d \leq (Mc)/(2f_s)$, where 'd' is the distance between the first and second signal receiving units, 'c' is the speed of sound in the environment of the first and second signal receiving units, '$f_s$' is a sampling frequency of the wideband signals, 'M' is a number of FFT points of the wideband signals and satisfies the equation $M = f_s/f_0$, and '$f_0$' is a fundamental frequency of the wideband signals.

5. The method of claim 4, wherein the first and second signal receiving units are spaced apart from each other by the distance 'd' substantially satisfying the following equation:

$$\left. \frac{Mc}{f_s d} \bar{f} \right|_{\bar{f}=0.5} \approx 1.$$

6. The method of claim 4, wherein the obtaining of the normalized frequency ($\bar{f}$) comprises:

performing an N-point FFT based on the following equation with respect to the respective wideband signals:

$$X_i(k) = \sum_{n=0}^{N-1} \sum_{m=1}^{M} e^{-j2\pi m f_0 \tau_i} e^{j2\pi m f_0 n T_s} e^{-j\frac{2\pi}{N} kn}$$

$$= \sum_{m=1}^{M} e^{-j2\pi m f_0 \tau_i} \sum_{n=0}^{N-1} e^{-j\frac{2\pi}{N} n(k - m f_0 N T_s)},$$

where $f_0 = f_s/M$, $mf_0$ denotes an m-th harmonic component, and $N=M$;

obtaining the '$P_m$' of a first signal ($X_{0,m}$) of the wideband signals and a second signal ($X_{1,m}$) of the wideband signals based on the following equation:

$$P_m = X_{1,m} X_{0,m}^* = M^2 e^{-j2\pi m \frac{f_s}{M}(\tau_1 - \tau_0)},$$

where $\tau_0$ is zero, and $\tau_1$ denotes a time delay of the second signal; and obtaining the normalized frequency ($\bar{f}$) by performing an M-point FFT based on the following equation:

$$\bar{f} = \frac{1}{M} \underset{m}{\mathrm{argmax}} \{FFT[P_m(m=1,2,\ldots,M)]\}.$$

7. The method of claim 4, wherein the calculating of the DOA comprises obtaining the DOA based on the following equation:

$$\cos\theta = \frac{Mc}{f_s d} \bar{f}.$$

8. A non-transitory computer-readable storage medium storing a program for estimating a Direction of Arrival (DOA) of wideband signals, the medium comprising instructions to cause a computer to:

generate an equation that relates respective wideband signals received by first and second signal receiving units;

obtain a normalized frequency ($\hat{f}$) by performing a fast Fourier transformation (FFT) on the equation, which equation is based on a cross power spectral density (CPSD) '$P_m$'; and calculate the DOA ($\theta$) of the wideband signals using the normalized frequency ($\hat{f}$), a distance between the first and second signal receiving units, and a number of FFT points of the wideband signals 'M', wherein the distance satisfies an equation $d \leqq (Mc)/(2f_s)$, where 'd' is the distance between the first and second signal receiving units, 'c' is the speed of sound in the environment of the first and second signal receiving units, '$f_s$' is a sampling frequency of the wideband signals, 'M' is a number of FFT points of the wideband signals and satisfies the equation $M = f_s/f_0$, and '$f_0$' is a fundamental frequency of the wideband signals.

* * * * *